(12) United States Patent
Lojewski et al.

(10) Patent No.: US 12,488,476 B2
(45) Date of Patent: Dec. 2, 2025

(54) METHOD FOR TRACKING AN OPTICAL MOUSE BY WAY OF FRAME ANCHORING

(71) Applicant: EM Microelectronic-Marin SA, Marin (CH)

(72) Inventors: Evan Lojewski, Woodland Park, CO (US); Brian Moore, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 323 days.

(21) Appl. No.: 18/140,322

(22) Filed: Apr. 27, 2023

(65) Prior Publication Data

US 2023/0419511 A1 Dec. 28, 2023

(30) Foreign Application Priority Data

Jun. 28, 2022 (EP) .................................... 22181599

(51) Int. Cl.
*G06T 7/246* (2017.01)
(52) U.S. Cl.
CPC .... *G06T 7/248* (2017.01); *G06T 2207/10016* (2013.01)
(58) Field of Classification Search
None
See application file for complete search history.

(56) References Cited

U.S. PATENT DOCUMENTS

| 6,195,475 | B1 * | 2/2001 | Beausoleil, Jr. | ........ | H04N 1/047 |
| | | | | | 382/312 |
| 8,582,182 | B2 * | 11/2013 | Zahnert | ................ | H04N 1/3876 |
| | | | | | 382/284 |
| 10,303,265 | B2 * | 5/2019 | Wang | ..................... | G06F 3/039 |
| 2006/0022116 | A1 | 2/2006 | Wang | | |

FOREIGN PATENT DOCUMENTS

EP 0 987 873 A2 3/2000

OTHER PUBLICATIONS

European Search Report for EP 22 18 1599 dated Nov. 30, 2022.

* cited by examiner

*Primary Examiner* — Vikkram Bali
(74) *Attorney, Agent, or Firm* — Sughrue Mion, PLLC

(57) ABSTRACT

A method for tracking a position of an optical computer mouse based on determining a spatial displacement between image frames. A respective image frame is considered as an anchor frame if the respective image frame comes first in a sequence of image frames or the distance of the respective image frame to its immediately previous anchor frame is equal to or greater than a displacement threshold, and the respective image is considered as an intermediate frame if its distance to its immediately previous anchor frame is below the displacement threshold. Only anchor frames are stored in memory and used for future displacement measurements between image frames captured by the mouse.

15 Claims, 4 Drawing Sheets

METHOD FOR TRACKING AN OPTICAL MOUSE BY WAY OF FRAME ANCHORING

CROSS-REFERENCE TO RELATED APPLICATIONS

This application claims priority to European Patent Application No. 22181599.6 filed Jun. 28, 2022, the entire contents of which are incorporated herein by reference.

TECHNICAL FIELD

The present invention relates to a method of improving optical mouse tracking consistency at low speeds by way of frame anchoring. The method concerns a way to control the displacement between images taken by the mouse to ensure the spacing is optimal. The invention also relates to an optical computer mouse configured to carry out the method.

BACKGROUND OF THE INVENTION

An optical mouse is a computer mouse which uses a light source, typically a light-emitting diode (LED), and a light detector, such as an array of photodiodes, to detect movement of the mouse relative to a surface. Variations of the optical mouse have largely replaced older mechanical mice, which rely on moving parts to sense motion.

In operation, the optical mouse takes a picture of the surface it sits upon, and then after moving slightly, it takes another picture. The two pictures or images, also referred to as image frames, should overlap, and the images are compared to determine what offset is needed to align the common surface patterns in both pictures. That offset is reported to a host computer as the measured movement. The mouse moves again, takes a new picture, compares it to the previous picture, and another displacement report is generated. This repeats hundreds or thousands of times per second and the motion between image frames is measured in tens of micrometers.

Currently known mouse-tracking methods often use a method, termed the sequential method here, which is a basic tracking algorithm demonstrating the problem the present invention addresses. In the sequential method, an image is collected by the mouse, digitized, and stored in memory. Then the collection of a new image is scheduled. At the scheduled time, a second image is collected, digitized, and then compared to the image stored in memory to calculate the likely displacement between the two images based on the motion of common features. This displacement is reported to a host computer, which uses this displacement to update the position of its cursor. This second image's data is stored in memory, overwriting the first image's data.

This displacement and the time between the sampling of the images is used to estimate the velocity of the mouse. This information is used to schedule the collection of a third image, at a time when it is expected that the mouse will have traveled a specific target distance from the second image. This target distance is a distance which is expected to maximize the accuracy of a displacement measurement between two images. At the scheduled time, the third image is collected, digitized, and it is compared to the second image, producing a new host report. The third image's data are stored in memory by overwriting the second image's data. This process repeats indefinitely with each newly scheduled and sampled image. The host computer, upon receiving displacement reports, adds them to the previous cursor position to shift to a new cursor position. Thus, the mouse position on the screen is the cumulative sum of all host reports.

In the case where more memory is available, multiple images may be stored in memory, and used in comparison to the current image to improve the accuracy of the individual displacement measurement at the cost of additional computation. In this scenario, once a displacement report is sent to the host, the current image data overwrite the oldest image data in memory.

Due to the use of a dynamic sampling rate generated by scheduling image collection according to mouse velocity, the number of samples collected, and the quality of the displacement measurement from each sample are kept independent of the mouse speed. The displacement variance is constant and the number of samples which are summed to produce the cursor position is normalized to distance traversed, at roughly one sample per target distance.

This dynamic sampling method, however, is limited by the imposition of a minimum sampling rate. Due to various constraints driven by host reporting requirements, acceleration-tracking requirements, and other considerations, there is some minimum sampling rate, or maximum delay, allowed between collected images. When moving at sufficiently slow speeds, this maximum delay will be insufficient for the mouse to reach the target displacement. This now-fixed sampling rate may degrade the accuracy of each individual measurement collected, as shorter displacements may be noisier or more error-prone. Furthermore, for traversing a given distance, the number of samples collected and accumulated by the host will increase as the mouse speed decreases, increasing the positional variance of the mouse cursor as the host integrates a greater number of noisy displacements. This issue, i.e., the loss of consistent tracking accuracy at low speeds caused by minimum sampling rate limitations, is the problem which the present invention seeks to address.

SUMMARY OF THE INVENTION

An object of the present invention is to overcome at least some of the above shortcomings relating to optical mouse tracking consistency at low mouse speeds.

According to a first aspect of the invention, there is provided a method of tracking a position of an optical computer mouse as recited in claim 1.

The proposed method relies on frame anchoring to selectively store and compare frames in order to produce measurements and reports of consistent quality even at low speeds. The proposed method will perform identically to current methods at nominal tracking speeds without significant increase in memory, power, or processing requirements.

At slow tracking speeds where the minimum sampling rate, i.e., the rate of generating image frames, exceeds the desired sampling rate, tracking accuracy is made equivalent to a system with no minimum sampling rate. The overwriting, rather than accumulation, of displacement reports from intermediate frames isolates the displacement reported by anchor frames from direct influence by any intermediate frames, effectively achieving spatial down-sampling. The variance that accumulates over multiple measurements is therefore decoupled from the temporal sampling rate, and is instead tied to displacement, normalizing variance to distance traveled. This ensures consistency of tracking across all speeds.

In summation, the proposed method negates the inherent trade-off between tracking accuracy at slow speeds and the responsiveness of the system when setting a minimum sampling rate. The tracking accuracy while users make slow, precise motions is directly improved in general, and is now unaffected (or further improved) by higher minimum sampling rates. This may be of particular importance when satisfying future demands for products with higher host reporting rates.

According to a second aspect of the invention, there is provided a non-transitory computer program product comprising instructions for implementing the steps of the method according to the first aspect when loaded and run on computing means of a computing device.

According to a third aspect of the invention, there is provided an optical computer mouse as recited in claim 15.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
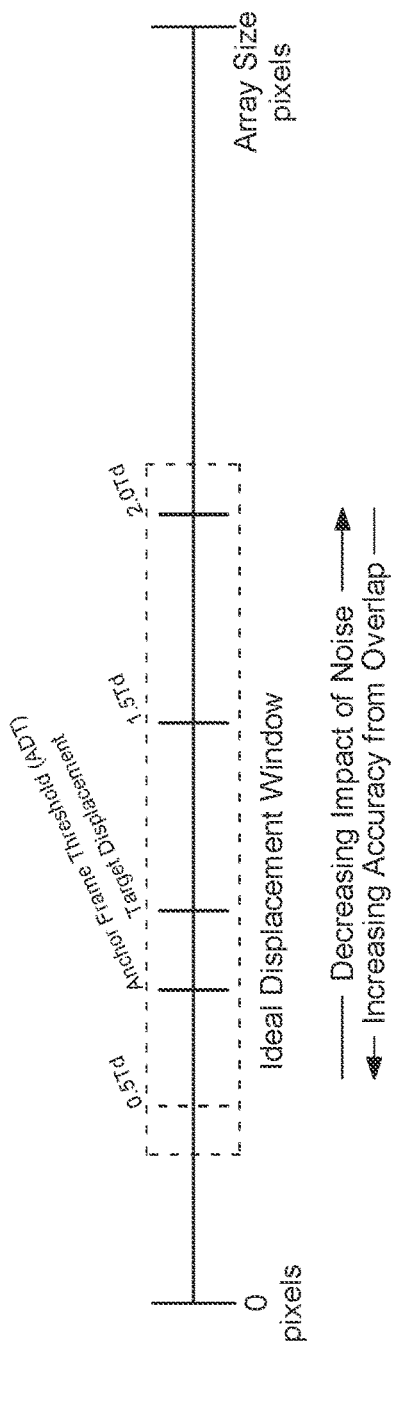
FIG. 1 illustrates the concept of measureable displacement distance.

A non-limiting example embodiment of the present invention will now be described in detail with reference to the attached figures. Identical or corresponding functional and structural elements which appear in different drawings are assigned the same reference numerals. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z". Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend".

Before explaining the proposed method of the present invention in more detail, some definitions are first given in the following with reference to FIGS. 1 and 2.

Sequential tracking method is a standard tracking method referenced for comparison, in which each newly sampled image is compared with the stored, immediately previous sampled images to calculate a displacement, and this is stored for comparison with future samples. This is generally a desirable process but runs into issues at slow tracking speeds where the displacement between individual frames is small, resulting in measurements of poorer accuracy and a greater accumulation of measurement error over a given distance. It is to be noted that that displacements in the present description are given in pixels. Alternatively, displacements may be scaled to any suitable different unit.

Frame anchoring method is the newly proposed tracking method, which compares each newly sampled image to selectively stored one or more previous images that are not necessarily the immediately previous sampled images. This method resembles the sequential method at nominal tracking speeds but behaves differently at slow tracking speeds to improve the individual measurement accuracy and reduce the accumulation of measurement error over a given distance.

Host system is the system receiving displacement reports from the mouse, which are used to determine the position of a cursor $P_k$. It is considered desirable that the cursor movement match the mouse movement as closely as possible, subject to arbitrary scaling.

Mouse tracking speed (MS) is the magnitude of the velocity of the mouse while tracking.

Nominal tracking speed ($MS_N$) is a range of mouse speeds equal to, or greater than the speed at which the minimum sampling rate will sample images with a displacement of $T_d$, up to the maximum speed at which the mouse can reliably track. With the frame anchoring method, while tracking at nominal speeds, all sampled frames are anchor frames.

Slow tracking speed ($MS_S$) refers to all mouse speeds below the speed at which the minimum sampling rate will sample images with a displacement less than the anchor displacement threshold, down to zero motion. With the frame anchoring method, while tracking at slow speeds, both anchor and intermediate frames are sampled.

Figure 2:
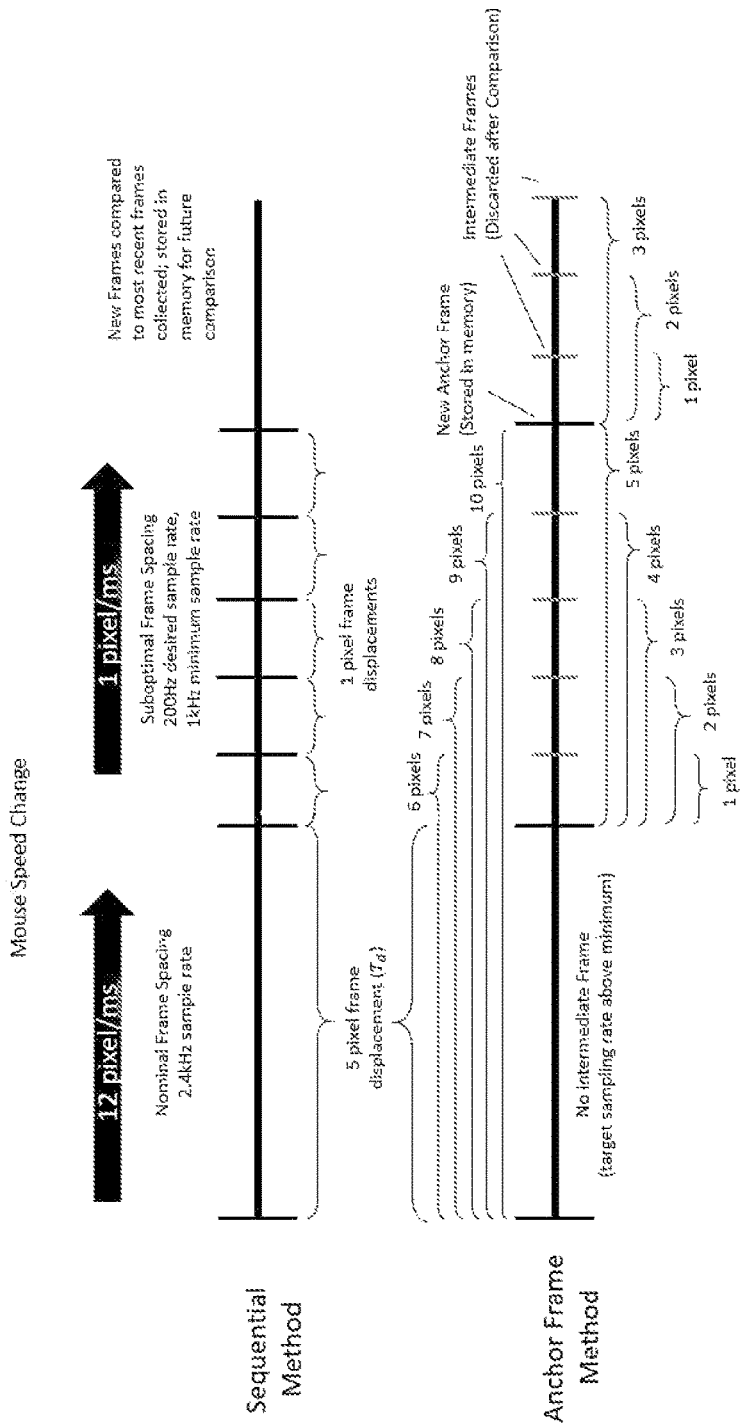
FIG. 2 explains the various measurement terms used in the following description.

Ideal displacement window (IDW) as illustrated in FIG. 1 is the range of ideal displacements that are expected to produce the lowest variance measurements. The trends that generate the window are 1) static features which may distort the macro pixel and subpixel calculations immediately around (0,0), 2) reduced overlap and common features leading to reduced subpixel accuracy as displacement increases, 3) increased impact of expected subpixel calculation noise per sample for samples with smaller macropixel displacement components.

Target displacement ($T_d$) as also illustrated in FIG. 1 is the displacement the mouse attempts to measure between image samples by adjusting the sample rate based on the estimated mouse speed. The target displacement should lie within the ideal displacement window, and if possible, be chosen so that the range of values $0.5*T_d$ to $1.5*T_d$ fall within the IDW.

Anchor displacement threshold (ADT) is the minimum distance from the current frame $F_k$ to the immediately previous anchor frame $AF_1$ that must be measured to designate and store the current frame as a new anchor frame. If the displacement calculation $x_k$ is less than ADT, then the frame $F_k$ is designated as an intermediate frame and not stored. The ADT is equal to the target displacement $T_d$ minus some tolerance, chosen such that negative accelerations while tracking at nominal speeds are unlikely to produce unnecessary intermediate frames.

Anchor frame (AF) is a frame whose data is stored in memory to compare with future image frames to generate relative displacement measurements δ. In the sequential method, every frame is stored and there is no distinction of frame type. In the frame anchoring method, only stored frames are anchor frames, making the terms synonymous. It is to be noted that a respective frame is considered as an anchor frame if the respective frame comes first in a sequence of frames.

Intermediate frame (IF) is a frame whose data are used to generate a displacement report when sampled but are not stored in memory to contribute to any future measurements.

Sample rate (Fs) is the frequency that the mouse samples at for a constant tracking speed. This value can be dynamic at nominal tracking speeds, but it is generally fixed at slow tracking speeds.

Minimum sample rate ($Fs_{min}$) is the minimum sampling rate dictated by host reporting requirements, acceleration tracking requirements, and/or other system considerations. This may prevent dynamic adjustment to the sampling rate at slow tracking speeds.

Sample delay is the inverse of sample rate, and it is the calculated time to wait until the next sample is collected. There is a maximum sample delay of $1/Fs_{min}$.

Frame comparison is a mathematical comparison using data from the current frame $F_k$ and any stored frame $AF_N$ to produce a displacement measurement $\delta_N$, which is used to help calculate the displacement $x_k$ between the current frame $F_k$ and the immediately previous stored frame $AF_1$.

Historic frame comparison is a frame comparison using a stored frame $AF_N$ that is not the immediately previous stored frame $AF_1$. Historic frame comparisons result in measurements $\delta_N$ where $N \geq 2$.

Refinement refers the improvement of a stored frame displacement calculation $D_N$ using the current displacement measurements $\delta$ and the stored covariance of frame displacement calculations $Cov(X)$. This improvement will reduce the variance of the stored value $D_N$ which will reduce the variance for all future displacement calculations $x_k$ for which $D_N$ is used.

$P_k$ denotes the host cursor position, where the host position is where the host will calculate the cursor to be based on the cumulative summation of all reports $r_1$ through $r_k$. $P_0$ is the initial position set at 0.

$F_k$ denotes the image frame k, where the initial image collected is image $F_0$, and every new frame designation is incremented by 1 independent of its anchor frame status.

$r_k$ denotes the host displacement report k or the current displacement value generated from comparisons with the sampled image frame $F_k$, where $r_1$ is the value of the first report generated from the comparison between $F_1$ and $F_0$. The value of $r_k$ represents the change in position since the previous report $r_{k-1}$. $r_k$ is equal to the calculated displacement $x_k$. For the frame anchoring method, if frame $F_{k-1}$ was designated an intermediate frame, $r_k$ is instead equal to the calculated displacement $x_k$ minus the previously calculated displacement $x_{k-1}$, which will have been stored as $D_0$.

$x_k$ denotes the calculated displacement between frame $F_k$ and the most recent stored frame $AF_1$. This value may be calculated using measurements $\delta$ made between the current frame $F_k$ and one or more stored frames AF, and stored displacement values D. In the sequential method, the stored frame $AF_1$ is the immediately previous frame, while in the frame anchoring method, the stored frame $AF_1$ is the immediately previous anchor frame, which is not necessarily the immediately previous frame.

$AF_N$ denotes the stored frame N, where N designates the age of the frame in memory. The most recently stored frame is $AF_1$, the next most recent frame is $AF_2$. When a new frame is stored, each stored frame has their label incremented from $AF_N$ to $AF_{N+1}$, and the current frame is stored as a new $AF_1$. With limited memory, the oldest stored frame data is displaced by the current frame data. In other words, the current frame is written from the current frame buffer to overwrite the oldest frame in memory, $AF_N$, and is labeled as the most recent anchor frame $AF_1$. All remaining anchor frames in memory have their labels updated or incremented by 1 to reflect the update. The current frame may be labeled the 0th stored frame $AF_0$ in addition to its label as Frame $F_k$ for formulaic purposes. When using the frame anchoring method, the current frame is only stored in memory if it is designated as an anchor frame, and thus $AF_N$ refers specifically to anchor frame N.

$\delta_N$ denotes the displacement measurement generated from comparing the current frame $F_k$ and the stored frame $AF_N$. Measurements made within the ideal displacement window (typical at nominal speeds) are expected to have roughly equal variance $Var(\delta) = \sigma_N^2$, while measurements that fall outside of the IDW (typical at slow speeds) are modeled to have variance $Var(\delta) = \sigma_N^2$, where $\sigma_N^2$ is equal to or greater than $\sigma_N^2$. With the frame anchoring method, when using historic frame comparisons, it is geometrically guaranteed that between $\delta_1$ and $\delta_2$, at least one of the two measurements will have a value between $0.5T_d$ and $1.5T_d$, which is expected to be within the IDW.

$D_N$ denotes the stored displacement value which records the distance calculated between stored frames $AF_N$ and $AF_{N+1}$. When the displacement $x_k$ is calculated it is stored as $D_0$. When the current frame is stored as a new frame, all stored values $D_N$, including $D_0$, have their label incremented (or decremented) to $D_{N+1}$. When stored frame $AF_{N+1}$ is overwritten due to memory constraints, stored value $D_N$ is disposed of.

$\sigma^2$ denotes the variance of a measurement or calculated value. The variance of a calculation derived from a single measurement will be proportional to the variance of the measurement. The variance of a calculation averaged from multiple measurements is a function of the individual measurement variances and the weights used to average them. With ideal weighting, the variance of a value averaged from multiple measurements will be equal to or less than the variance of any of the individual measurements.

$\sigma_\delta^2$ denotes the variance of an individual measurement $\delta$ produced between the current frame and a stored frame.

$\sigma_N^2$ denotes the expected variance of a measurement $\delta$ produced while tracking at nominal mouse speeds, or a measurement $\delta$ otherwise produced with a displacement inside the IDW. This variance is expected to be equal to or less than $\sigma_S^2$.

$\sigma_S^2$ denotes the expected variance of a measurement $\delta$ produced while tracking at slow mouse speeds, or a measurement $\delta$ otherwise produced with a displacement outside the IDW. This variance is expected to be equal to or greater than $\sigma_N^2$.

$\sigma_x^2$ denotes the variance of the displacement calculation $x_k$.

$\sigma_{D_N}^2$ denotes the variance of the stored displacement calculation $D_N$.

Y refers to an arbitrary distance for the mouse to track across (100 pixels, 1000 pixels, etc.).

$k_N$ refers to the expected number of samples required to traverse a reference distance Y while tracking at nominal speeds.

$k_S$ refers to the expected number of samples required to traverse a reference distance Y while tracking at slow speeds.

Figure 3:
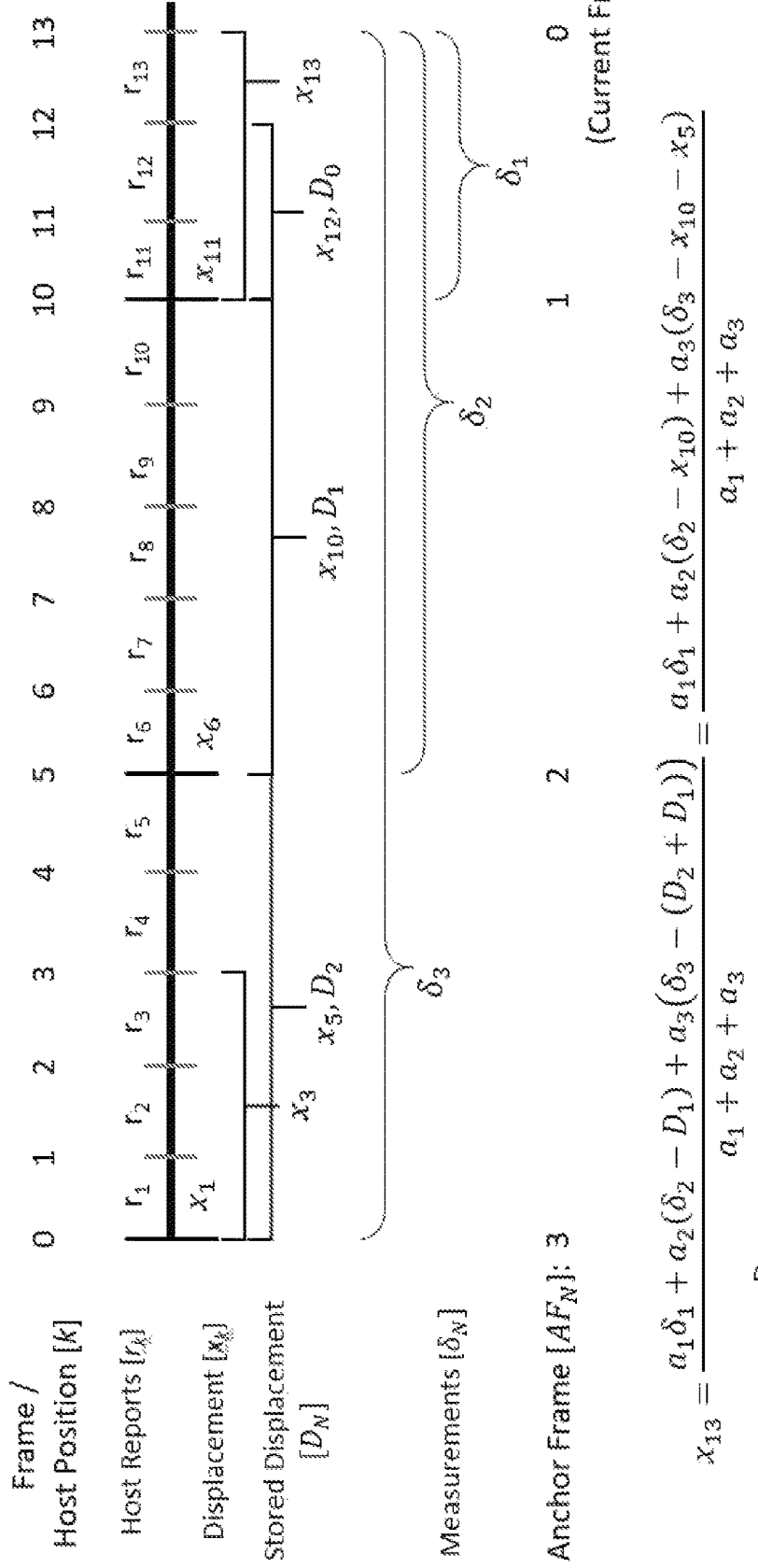
FIG. 3 outlines the traditional sequential method and the proposed frame anchoring method according to the present invention.

The proposed frame anchoring method is next explained in more detail with reference to the figures. The proposed method is in some respects somewhat similar to the sequential method explained above. The proposed frame anchoring method is outlined in the lower part of FIG. 3, where the upper part outlines the principle of the sequential method for comparison. It is to be noted that the specific numerical values in FIG. 3 are merely some example values, but they are not intended to limit the scope by any means.

An image is collected by the mouse, digitized, and stored in memory. A second image is then collected, digitized, and compared with the first image to calculate a displacement. Where the frame anchoring method mainly differs is in the generated displacement report sent to the host, and the storage of the current frame's data. If the displacement calculated between the two images is equal to the target displacement, plus some window of tolerance, then the current image is classified as an anchor frame. Its data overwrites the previous image data, the displacement is reported to the host, and a new image is scheduled based on the estimate of the mouse's velocity. This behavior is identical to the sequential method.

If the displacement falls short of this window of ideal displacement, the current second frame is instead classified as an intermediate frame. The displacement from the image stored in memory is still reported to the host, and is still used to estimate the mouse's velocity. However, the current image data is not stored in memory. The next, third image collection is scheduled for when the mouse is expected to be at the target displacement from the previous image still in memory. When the third image is collected, it is digitized and compared with the first image still in memory to create a displacement measurement. Because the second image was an intermediate frame or image, the previous displacement measurement generated with image 2 is subtracted from the current displacement measurement generated from image 3 to produce the host report. This occurs regardless of whether the current image 3 is classified as an intermediate or anchor frame from its own displacement measurement.

If this third image is another intermediate frame, it is similarly discarded without being stored in memory, and the first image still retained in memory is used as the basis of comparison until the mouse has moved a sufficient distance away to produce a new anchor frame. If this new image is a new anchor frame, it is stored in memory, overwriting the previous image in memory, and it becomes the new basis of future comparisons. The following displacement report does not have the anchor frame's displacement measurement subtracted from it.

In summary, with the anchor frame method, all images collected are still used to produce displacement measurements, and provide displacement reports to the host. However, only images identified as anchor frames are stored in memory to use for comparisons with future images. Displacement measurements produced from intermediate frames have their contribution to the host's cursor position overwritten by subtracting them from the subsequent displacement report, nullifying any long-term contribution to the accuracy of the cursor position.

As a result, when the mouse is moving at nominal speeds, where the time to traverse the target displacement is less than the maximum delay between images, all collected images will be anchor frames, and the behavior will be identical to the sequential method in this regard. When the mouse is moving at slow speeds, some collected images will be a mix of intermediate and anchor frames, with all frames contributing to the position of the mouse at the particular time of their collection, but only anchor frames contributing to the long-term position of the host's cursor. It can be shown that, at slow speeds, the positional variance of the host's cursor will be very similar to the variance when tracking at nominal speeds, and will keep the accuracy normalized to distance traveled and independent from mouse speed.

Figure 4:
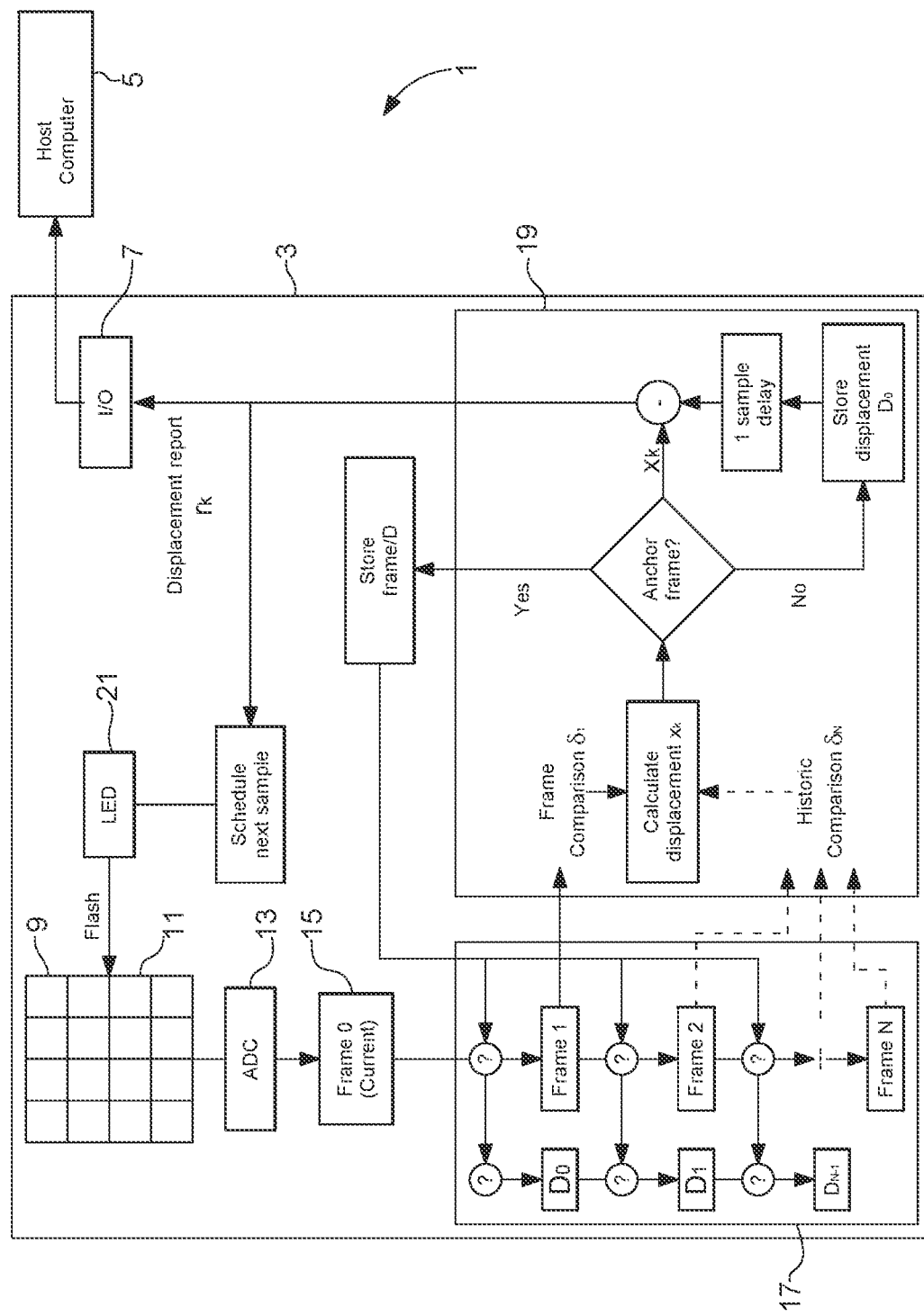
FIG. 4 is a block diagram schematically illustrating some functional elements of a mouse tracking system, which may be used to implement the teachings of the present invention.

FIG. 4 shows a simplified block diagram of a system 1 configured to implement the present method of tracking a position of an optical computer mouse 3 based on determining a spatial displacement between image frames. The term optical mouse is understood to encompass all computer mice that utilize cameras and surface imaging in order to track its location. The system comprises a computer mouse 3, which is operatively connected to a host computer 5. The connection may be a wired connection or a wireless connection depending on the implementation. Different connection examples that may be used are PS/2, universal serial bus (USB) or Bluetooth. For this purpose, the mouse comprises an input/output or interface unit 7. The mouse 3 also comprises an image sensor having an array 9 of photosensitive pixels 11, which is operatively connected to an analog-to-digital converter (ADC) 13, which is configured to digitize the images collected by the mouse. The ADC 13 is operatively connected to a frame buffer 15 configured to keep the current frame in the buffer. The frame buffer is in turn operatively connected to a memory unit 17 configured to store the digitized images (i.e., frames) received from the ADC 13 through the frame buffer 15. The ADC is further operatively connected to a processor 19, which is configured to carry out most of the calculations as will be explained later in more detail. The mouse further comprises a light source 21, and in particular a light-emitting diode (LED), to allow the photo-sensitive pixels 11 to detect the emitted light beam to thereby detect movement relative to a surface. The block diagram of FIG. 4 also shows some elements or method steps relating to the actual operation of the system, but these steps become clearer upon reading the following description.

Sampling rate calculations are next explained in more detail. For traversing a given distance Y, the number of samples k required for nominal and slow speeds are:

$$k_n \cong \frac{Y}{Td}, k_s = \frac{Y}{avg(r_i)} \cong \frac{Y}{MS_S \div Fs_{min}}, k_s \geq k_n$$

For example, for a distance Y of 1000 pixels with a target displacement of 4 pixels and a minimum sampling rate of 1000 Hz, a nominal speed of 8000 pixels/sec and a slow speed of 1250 pixel/sec, the number of samples collected while tracking across that distance at each speed is $$k_N \cong \frac{1000}{4} = 250 \text{ samples}, k_S \cong \frac{1000}{1250 \div 1000} = 800 \text{ samples}$$

3 The sequential method (with no historic frame comparisons) reports at both nominal and slow speeds:

$$r_k = x_k = \delta_1,$$

$$\text{Var}(r_k) = \text{Var}(\delta_1) = \begin{cases} \sigma_N^2, & MS = MS_N \\ \sigma_S^2, & MS = MS_S \end{cases}$$

Host cursor position aggregated from the sequential method reports:

$$P_k = P_0 + \sum_1^k r_i$$

$$\text{Var}(P_k) = 0 + \sum_1^k \text{Var}(r_i) = \begin{cases} k_n \sigma_N^2, & MS = MS_N \\ k_s \sigma_S^2, & MS = MS_S \end{cases}$$

The sequential method presents a very clear linear relationship between additional samples and the aggregation of noise. The variance of the position of the pointer accumulated over a given distance will at least grow linearly with sample count, if not more so due to potentially higher variance from each individual measurement taken outside of the ideal displacement window. At nominal tracking speeds, the number of samples over a given distance is roughly constant, and therefore the tracking accuracy remains consistent when normalized for distance. The frame anchoring method seeks to extend this consistency to slow tracking speeds.

The frame anchoring method reports at nominal and slow speeds:

$$r_k = x_k - D_0,$$

$$D_0 = \begin{cases} 0, & \|x_{k-1}\| \geq ADT \\ x_{k-1}, & \|x_{k-1}\| < ADT \end{cases}$$

Displacement reports to the host; new host position calculated:

$$P_k = r_k + P_{k-1}$$

An example is given next for slow mouse speed MS=1 pixel/sample and ADT=3.5 pixels; every $4^{th}$ sample is an anchor frame.

Initial (Anchor) Frame 0:

$$r_0 = DNE \; P_0 = 0$$

Intermediate Frame 1:

$$r_1 = x_1 \; P_1 = x_1 + 0 = x_1$$

Intermediate Frame 2:

$$r_2 = x_2 - x_1 \; P_2 = (x_2 - x_1) + x_1 = x_2$$

Intermediate Frame 3:

$$r_3 = x_3 - x_2 \; P_3 = (x_3 - x_2) + x_2 = x_3$$

Anchor Frame 4:

$$r_4 = x_4 - x_3 \; P_4 = (x_4 - x_3) + x_3 = x_4$$

Intermediate Frame 5:

$$r_5 = x_5 \; P_5 = (x_5) + x_4$$

Intermediate Frame 6:

$$r_6 = x_6 - x_5 \; P_6 = (x_6 - x_5) + (x_5 + x_4) = x_6 + x_4$$

Intermediate Frame 7:

$$r_7 = x_7 - x_6 \; P_7 = (x_7 - x_6) + (x_6 + x_4) = x_7 + x_4$$

Anchor Frame 8:

$$r_8 = x_8 - x_7 \; P_8 = (x_8 - x_7) + (x_7 + x_4) = x_8 + x_4$$

Intermediate Frame 9:

$$r_9 = x_9 \; P_9 = (x_9) + (x_8 + x_4)$$

Intermediate Frame 10:

$$r_{10} = x_{10} - x_9 \; P_{10} = (x_{10} - x_9) + (x_9 + x_8 + x_4)$$

Host cursor position aggregated from the frame anchoring method reports:

$$P_k = P_0 + \sum_1^k r_i$$

$$\text{Var}(P_k) = 0 + \text{Var}\left(\sum_1^k r_i\right)$$

$$\text{Var}(P_k) = 0 + \text{Var}\left(\sum_1^k r_i\right) = \begin{cases} \sum_1^{k_n} \text{Var}(x_i), & MS = MS_N \\ \sum_1^{k_s/k_a} \text{Var}(x_{i \cdot k_a}), & MS = MS_S \end{cases}$$

$$\text{Var}(P_k) = \begin{cases} k_n \sigma_N^2, & MS = MS_N \\ \dfrac{k_s}{k_a} \sigma_N^2, & MS = MS_S \end{cases}$$

$$k_a \cong \frac{T_d}{avg(r_i)} \cong \frac{T_d}{MS * fs_{min}}, \; \frac{k_s}{k_a} \cong \frac{Y}{T_d} \cong k_n$$

Due to the conditional calculations of $r_k$ in the frame anchoring method, the net sum of host reports at a nominal tracking speed is equal to the sum of all displacement calculations $x_1$ to $x_{kN}$, while the net sum of the host reports at a slow tracking speed is equal only to the sum of selective terms within the set of calculated displacements $x_1$ through $x_{kS}$ which are calculated on anchor frames. Anchor frames occur roughly every $k_a^{th}$ of the total $k_S$ samples. As these specific displacements are equal to, or greater than the anchor displacement threshold (ADT) and roughly equal to the target displacement $T_d$, the measurement should fall within the IDW and thus the variance of each term is expected to be $\sigma_N^2$. As a result, the expected variance in host position $P_k$ at slow tracking speeds is approximately equal to the expected variance in host position $P_k$ at nominal tracking speeds.

The displacement calculations are next explained in more detail. The displacement calculation for $x_k$ may be taken as the average of all available combinations of measured and stored terms that equate to the displacement between the immediately previous stored frame $AF_1$ and the current frame $F_k$.

An example with one stored frame for comparison:

$$x_k = \delta_1$$

An example with two stored frames for comparison:

$$x_k = \frac{\delta_1 + (\delta_2 - D_2)}{2}$$

An example using three stored frames for comparison:

$$x_k = \frac{\delta_1 + (\delta_2 - D_1) + (\delta_3 - (D_2 + D_1))}{3}$$

Weights or weighting factors can be applied to improve the accuracy of the calculation depending on which terms are considered more accurate (i.e., the value of the respective weight advantageously inversely correlates with the noise value of the displacement measurement it is assigned to):

$$x_k = \frac{a_1\delta_1 + a_2(\delta_2 - D_1) + a_3(\delta_3 - (D_2 + D_1))}{a_1 + a_2 + a_3}$$

Put in its general form, for a displacement calculation using N stored frames:

$$x_k = \sum_{i=1}^{n} \frac{a_i\left(\delta_i - \sum_{j=1}^{i-1} D_j\right)}{\sum_{i=1}^{m} a_i}$$

This can also more cleanly be represented as a matrix equation:

$$C = \begin{bmatrix} L_N \\ 0, I_{N-1} \end{bmatrix}, \quad X = \begin{bmatrix} x_k \\ D^* \end{bmatrix}, \quad M = \begin{bmatrix} \delta \\ D \end{bmatrix},$$

$$A = \begin{cases} I_{2N-1}, & \text{equal variance} \\ Cov(M), & \text{tracked variance} \end{cases}$$

$$M = CX,$$

$$X = inv(C^T A^{-1} C) C^T A^{-1} M$$

$$Cov(X) = inv(C^T A^{-1} C)$$

$$C = \begin{bmatrix} 1 & 0 & \cdots & 0 \\ 1 & \ddots & \ddots & \vdots \\ \vdots & \ddots & \ddots & 0 \\ 1 & \cdots & 1 & 1 \\ 0 & 1 & \cdots & 0 \\ \vdots & \vdots & \ddots & \vdots \\ 0 & 0 & \cdots & 1 \end{bmatrix}, \quad X = \begin{bmatrix} x_k \\ D_1^* \\ \vdots \\ D_{N-1}^* \end{bmatrix}, \quad M = \begin{bmatrix} \delta_1 \\ \vdots \\ \delta_N \\ D_1 \\ \vdots \\ D_{N-1} \end{bmatrix},$$

$$A = \begin{bmatrix} Cov(\delta_1, \delta_1) & Cov(\delta_1, \delta_2,) & \cdots & Cov(\delta_1, D_{N-1}) \\ Cov(\delta_1, \delta_2) & Cov(\delta_2, \delta_2) & \cdots & Cov(\delta_2, D_{N-1}) \\ \vdots & \vdots & \ddots & \vdots \\ Cov(\delta_1, D_{N-1}) & Cov(\delta_2, D_{N-1}) & \cdots & Cov(D_{N-1}, D_{N-1}) \end{bmatrix}$$

$$Cov(X) = \begin{bmatrix} Cov(x_k, x_k) & Cov(x_k, D_1^*,) & \cdots & Cov(x_k, D_{N-1}^*) \\ Cov(x_k, D_1^*) & Cov(D_1^*, D_1^*) & \cdots & Cov(D_1^*, D_{N-1}^*) \\ \vdots & \vdots & \ddots & \vdots \\ Cov(x_k, D_{N-1}^*) & Cov(D_1^*, D_{N-1}^*) & \cdots & Cov(D_{N-1}^*, D_{N-1}^*) \end{bmatrix}$$

The general form of the displacement calculation is a linear simultaneous equation of the measured terms and stored values, represented as a matrix solution.

The coefficient matrix C consists of two sections. The upper section is an N×N lower-triangular matrix of ones, $L_N$, where N is the number of stored frames used in the calculation. The lower section is made of zeros in the left-most column, and an (N−1)×(N−1) identity matrix $I_{N-1}$ in the remaining area.

The state vector X, which contains the values we want to calculate, is a column vector with the displacement calculation $x_k$ as the first term, and the lower terms are the series of stored frame displacements $D_1^*, D_2^*, \ldots D_{N-1}^*$ whose value will be refined from their current known value D to a more accurate value D* during the calculation.

The measurement column vector M consists of two sections to match C. The upper section is the series of displacement measurements δ made between the current frame and the N stored frames in memory, $\delta_1, \delta_2, \ldots \delta_N$. The lower section contains the stored displacement measurements between the stored frames in memory, $D_1, D_2, \ldots D_{N-1}$.

The weight matrix A can have arbitrary terms, but for the two example cases modeled here, it is either a (2N−1)×(2N−1) identity matrix $I_{2N-1}$ in the equally weighted case, or the covariance matrix of M, Cov(M) in the inverse-variance weighted case. The state covariance matrix Cov(X) represents the variances of each term calculated in X given the assumed covariance A.

A refinement step, as explained later, can be performed by substituting the newly calculated values D* for D in the next sample's measurement matrix M, and substituting the relevant covariance elements for D* from Cov(X) into the next measurement's weight matrix A.

Matrices C, X, A, and M will vary in size depending on available stored frames and measurements made. Solving for X with a linear least-squares (LLSE) method (A=$\sigma^2$*$I_{2N-1}$) will calculate the elements of X while presuming equal variance $\sigma^2$ between all of the measurements δ and stored values D.

Using the assumption of equal variance for all terms in M, the solution reduces to:

$$X = (C^T C)^{-1} C^T M$$

For the case of only one anchor frame stored in memory, N=1, with no stored values D, the calculation is trivial:

$$x_k = \delta_1$$

In the case of using at least one historic frame comparison by retaining two anchor frames in memory and generating a comparison between the current frame and each anchor frame we get:

$$x_k = \frac{2\delta_1 + (\delta_2 - D_1)}{3}, \quad D_1^* = \frac{2D_1 + (\delta_2 - \delta_1)}{3},$$

$$Cov(X) = \begin{bmatrix} 2/3 & -1/3 \\ -1/3 & 2/3 \end{bmatrix} \sigma_\delta^2$$

Which is a weighted average with the assumption that both displacement measurements δ and the previously calculated displacement between anchor frames $D_1$ have equal variance $\sigma_\delta^2$. If this assumption is correct, the variance of the displacement calculation $x_k$ would be $\frac{2}{3}^{rd}$ s of the variance of an individual measurement $\delta_1$ which represents a substantial benefit to accuracy gained from the multiple measurements.

The scenario in which three anchor frames are used has a similar form:

$$x_k = \frac{5\delta_1 + 2(\delta_2 - D_1) + (\delta_3 - (D_2 + D_1))}{8},$$

$$D_1^* = \frac{5D_1 + 2(\delta_2 - \delta_1) + (\delta_3 - (\delta_1 + D_2))}{8},$$

$$D_2^* = \frac{5D_2 + 2(\delta_3 - \delta_2) + (\delta_3 - (\delta_1 + D_2))}{8},$$

$$Cov(X) = \begin{bmatrix} 5/8 & -3/8 & -1/8 \\ -3/8 & 5/8 & -1/8 \\ -1/8 & -1/8 & 5/8 \end{bmatrix} \sigma^2$$

This will result in a calculated $x_k$ with a variance ⅝ths that of $\delta_1$ alone, presuming all δ and D terms have variances equal to or less than $\delta_1$.

If instead the variances and covariances of each element in M are tracked as covariance matrix A, the variances Cov(X) for each calculated term X will be equal to or less than those calculated in the equally weighted case.

Under normal operation, the stored values D are previously calculated displacements x between previously sampled anchor frames. With the initial few stored frames sampled, these calculated displacements will have a variance $\sigma_S^2$ equal to an individual displacement measurement $\delta_k$. Subsequent calculations will have more accurate values for $x_k$, which will be stored as a new values D with lower variance, which will lead to more accurate calculated displacements $x_k$, which will be stored as yet more accurate values of D. This will continue until a steady state is reached at some lower minimum variance. For the case of two stored frames in memory, with a single stored value $D_1$, the initial variance of $x_k$ is expected to be ⅔rds the measurement variance $\sigma_S^2$. The terminal variance of $x_k$ and each stored value D is expected to be close to 0.618. This is not a refinement step, as the stored values of D are not modified but are displaced overtime with more accurate values of D with each new stored frame.

This iterative relationship means that the displacements D stored in memory have a true variance less than that of an individual measurement, and thus the true variance of new displacement calculations $x_k$ will be less than modeled in the previous example Cov(X).

The concept of improvements to intermediate frames will be next explained in more detail. When tracking at nominal mouse speeds, the sequential method and the frame anchoring method behave identically or substantially identically. Every frame sampled is approximately equal to the target displacement $T_d$, which lies inside the ideal displacement window (IDW) and will produce measurements of variance $\sigma_N^2$ which is equal to or less than the variance of samples taken outside of the IDW at slow speeds, $\sigma_s^2$. The accuracy of each individual measurement $x_k$, and the overall host position $P_k$, are identical or substantially identically between the two methods.

When tracking at slow speeds, the sequential method and the frame anchoring method perform differently. Consider the example below with two stored frames, one stored displacement value, and fixed weighting $a_1=2$, $a_2=1$.

$$x_k = \frac{2\delta_1 + (\delta_2 - D_1)}{3},$$

$$\text{Var}(x_k) = \sigma_x^2 = \frac{4}{9}\sigma_S^2 \text{ or } \sigma_x^2 + \frac{1}{9}\sigma_S^2 + \frac{1}{9}\sigma_N^2$$

With the sequential method, the measured displacement $\delta_1$ is expected to have a variance of $\sigma_S^2$ as it will fall short of the IDW. The stored value $D_1$ is equal to $x_{k-1}$ which will have a similar variance $\sigma_S^2$. The measurement $\delta_2$ to the second stored frame in memory may or may not have a displacement that falls within the IDW, so it may have a variance of either $\sigma_N^2$ or $\sigma_S^2$.

$$\text{Var}(x_k) = \sigma_x^2 = \frac{6}{9}\sigma_S^2 \text{ or } \sigma_x^2 = \frac{5}{9}\sigma_S^2 + \frac{1}{9}\sigma_N^2$$

With the fame anchoring method, there are two cases depending on the current frame type. When sampling a new anchor frame, the displacement between the current frame and the two previous frames are both expected to be within the IDW, assuming the upper bound of the IDW is greater than $2T_d$. The stored value $D_1$ between the two stored anchor frames will have been a calculated displacement approximately equal to $T_d$. All three terms are expected to fall within the IDW, and thus all three terms are expected to have a variance equal to or less than $\sigma_N^2$.

$$\text{Var}(x_k) = \sigma_x^2 = \frac{4}{9}\sigma_N^2 + \frac{1}{9}\sigma_N^2 + \frac{1}{9}\sigma_N^2 = \frac{6}{9}\sigma_N^2$$

When sampling an intermediate frame, it is geometrically guaranteed that the current frame will be within $0.5T_d$ and $1.5T_d$ of at least one of the two anchor frames stored in memory. Thus between $\delta_1$ and $\delta_2$, while both may have displacements within the IDW and have a variance of $\sigma_N^2$, it is guaranteed that at least one of them will have a variance of $\sigma_N^2$, assuming that the range of values $0.5T_d$ to $1.5T_d$ lies within the IDW. Furthermore, the stored displacement value $D_1$ is still a previously calculated displacement between two anchor frames, which ensures it will have a variance equal to or less than $\sigma_N^2$.

$$\text{Var}(x_k) = \sigma_x^2 = \frac{4}{9}\sigma_S^2 + \frac{2}{9}\sigma_N^2 \text{ or } \sigma_x^2 = \frac{1}{9}\sigma_S^2 + \frac{5}{9}\sigma_N^2$$

Thus, all calculated displacement values from frames sampled at slow speeds, including intermediate frames, will have equal or reduced variance relative to the calculated displacement from the sequential method.

$$\frac{6}{9}\sigma_S^2 \geq \left(\frac{5}{9}\sigma_S^2 + \frac{1}{9}\sigma_N^2\right) \geq \left(\frac{4}{9}\sigma_S^2 + \frac{2}{9}\sigma_N^2\right) \geq \left(\frac{1}{9}\sigma_S^2 + \frac{5}{9}\sigma_N^2\right) \geq \frac{6}{9}\sigma_N^2$$

This demonstrates the following three points:
1) Sequential displacement calculations will have equal or greater variance at slow mouse speeds than at nominal mouse speeds.
2) Displacement calculations performed between anchor frames at both nominal and slow speeds will have equal variance to sequential displacement at nominal speeds.
3) Displacement calculations performed on intermediate frames will have equal or less variance than sequential displacement calculations at slow mouse speeds.

Thus, the proposed frame anchoring method maintains a higher quality measurement for the anchor frame to anchor frame displacement measurements that form the aggregate host position over multiple frames compared with the sequential method, and when using historic frames, improves the accuracy of both anchor displacements and intermediate displacements compared with sequential displacements at slow speeds.

An optional refinement aspect of the present invention is next explained in more detail. The frame anchoring method offers an optional, additional benefit over the sequential method, termed here as 'refinement'. While it may be possible to perform this step while using the sequential method, it is of limited practical benefit. The frame anchoring method makes the implementation of this practical.

When a new displacement calculation $x_k$ is performed, it is possible to simultaneously perform a calculation to refine any stored displacement values between stored frames, updating the value from D to D*. Assuming appropriate weights are chosen, every measurement that utilizes a value D can generate a refined value D* with a reduced variance, down to a limit of zero variance. When operating using only a single stored frame $AF_1$, no refinement is possible in either the sequential or frame anchoring method, as no measurements are made which will relate mathematically to stored, previously calculated values D.

When operating with two stored frames $AF_1$ and $AF_2$, the stored displacement value $D_1$ between the two stored frames can be refined to $D_1^*$, reducing its variance. When operating with the sequential method, or the frame anchoring method while at nominal speeds, this refinement provides no benefit, as $AF_2$ will be overwritten to store the current frame, and thus the refined value $D^*$ between $AF_1$ and $AF_2$ will not be used in any future calculations.

However, when operating with the frame anchoring method at slow speeds, and when sampling an intermediate frame, the stored frame $AF_2$ in memory will not be overwritten, and the value $D_1$ can be utilized in the next displacement calculation $x_{k+1}$ for frame $F_{k+1}$, and every subsequent calculation up until and including the next anchor frame measurement. Any refinement on $D_1$ performed during an intermediate frame will improve the accuracy of $D_1$, and thereby improve the accuracy of any later calculation that still references the value. Thus, the refinement step will improve the accuracy of any anchor frame with every intermediate frame sample between it and the previous anchor frame.

In the case of using three or more stored frames, it becomes possible for the sequential method to benefit from refinement as well. While the oldest stored frame $AF_3$ will always be overwritten by the current frame, rendering refinement to $D_2$ irrelevant for future calculations, $D_1$ can still be updated to $D_1^*$ for use in the next calculation as the new $D_2$. However, this only offers the chance for the sequential method to refine the value $D_1$ once, as the value of $D_1$ will only be used twice after it is stored and once after it is refined.

The ability to refine and make use of stored values D in the sequential method can be increased arbitrarily by extending the history of frames kept and used for displacement measurements. However, this requires increasing the available memory to store additional frame data. Furthermore, this requires performing an additional displacement measurement δ on every frame sampled for each additional frame stored, which is computationally expensive. There is also a spatial limitation, as additional frames stored in memory are only useful to generate measurements so long as they overlap sufficiently with the current frame. To ensure the greater history of frames all overlap with the current frame would require sampling at a faster rate with a smaller target displacement between each frame. Shortening the target displacement may degrade the accuracy of the individual measurements, and increasing the number of samples will degrade the host's positional accuracy, both of which will quickly render any benefit from refinement moot.

For these reasons, benefitting from more than one or two refinement steps is difficult and costly for the sequential method, and may not provide an overall improvement in positional variance seen by the host. By contrast, the frame anchoring method can undergo an arbitrary number of refinement steps between anchor frames while using only a limited amount of memory and performing a limited number of measurements. Greater benefit still requires a greater number of intermediate samples, but it does not require increased computation per sample, nor does it counterproductively increase the host cursor's positional variance as a result of increasing the sample rate.

In the limit, the stored values D can have their variances reduced to 0 after an infinite number of samples and refinement steps, if using ideal weights. With D variances of zero and proper weights, the variance of measurement $x_k$ using N measurements δ will be equal to $1/N\sigma_\delta^2$. This minimum variance is approached asymptotically with a greater number of intermediate frames. The first refinement step offers the greatest individual benefit, but the overall reduction in variance is still small compared with the potential reduction in variance that can be achieved with 10 to 30 refinement steps.

Tables below track the calculated displacement variance $Var(x_k)$ relative to an individual measurement variance $Var(\delta)$ for a given number of refinement steps for a frame anchoring method with two stored anchor frames and three stored anchor frames. The best performance of the sequential method is equal to 0 refinement steps with the two-stored frame system, and a single refinement step with the three-stored frame system.

TABLE 1

Displacement calculation variance from refinement with two frames of memory

| No. of Refinements | Var($x_k$) | Var(D1*) | Var(D1) |
| --- | --- | --- | --- |
| 0 | 0.618 | 0.472 | 0.618 |
| 1 | 0.596 | 0.382 | 0.472 |
| 2 | 0.580 | 0.321 | 0.382 |
| 10 | 0.535 | 0.141 | 0.151 |
| 30 | 0.515 | 0.058 | 0.060 |
| 100 | 0.505 | 0.019 | 0.019 |
| Infinity | 0.500 | 0 | 0 |

Note that each step of refinement has diminishing returns, so a large number of refinement steps are necessary to produce the full benefit. One or two refinement steps brings the variance below 0.6 times the measurement variance. Ten steps are sufficient to bring the variance below 0.54, and 30 refinement steps will reduce the variance below 0.52. A pixel width of 25.4 μm and a mouse speed of 1 inch per second will translate to a mouse speed of 1000 pixels/sec. At a fixed sample rate of 1000 Hz and a target displacement of four pixels, three refinement steps on three intermediate frames between each anchor frame may occur. If a fixed sample rate of 8000 Hz is used, then 32 intermediate frames will be sampled between each anchor frame, providing a potential of 32 refinement steps.

TABLE 2

Displacement calculation variance from refinement with three frames of memory

| No. of refinements | Var($x_k$) | Var($D_1^*$) | Var($D_2^*$) | Var($D_1$) | Var($D_2$) |
| --- | --- | --- | --- | --- | --- |
| 0 | 0.463 | 0.376 | 0.316 | 0.463 | 0.376 |
| 1 | 0.442 | 0.316 | 0.273 | 0.376 | 0.316 |
| 2 | 0.427 | 0.273 | 0.240 | 0.316 | 0.273 |
| 10 | 0.378 | 0.130 | 0.122 | 0.139 | 0.130 |
| 30 | 0.352 | 0.057 | 0.055 | 0.058 | 0.057 |
| 100 | 0.340 | 0.019 | 0.019 | 0.019 | 0.019 |
| Infinity | 0.333 | 0 | 0 | 0 | 0 |

Implementing a refinement step inverts the benefit of the frame anchoring method. Without the frame anchoring method, the tracking accuracy degrades with an increase in the number of samples captured while traversing a given distance. With the frame anchoring method, tracking accuracy becomes independent of the number of samples collected while traversing a given distance. With the frame anchoring method plus refinement, the connection between the number of samples collected and tracking accuracy is re-established, now improving with an increase in the number of samples captured while traversing a given distance.

Figure 5:
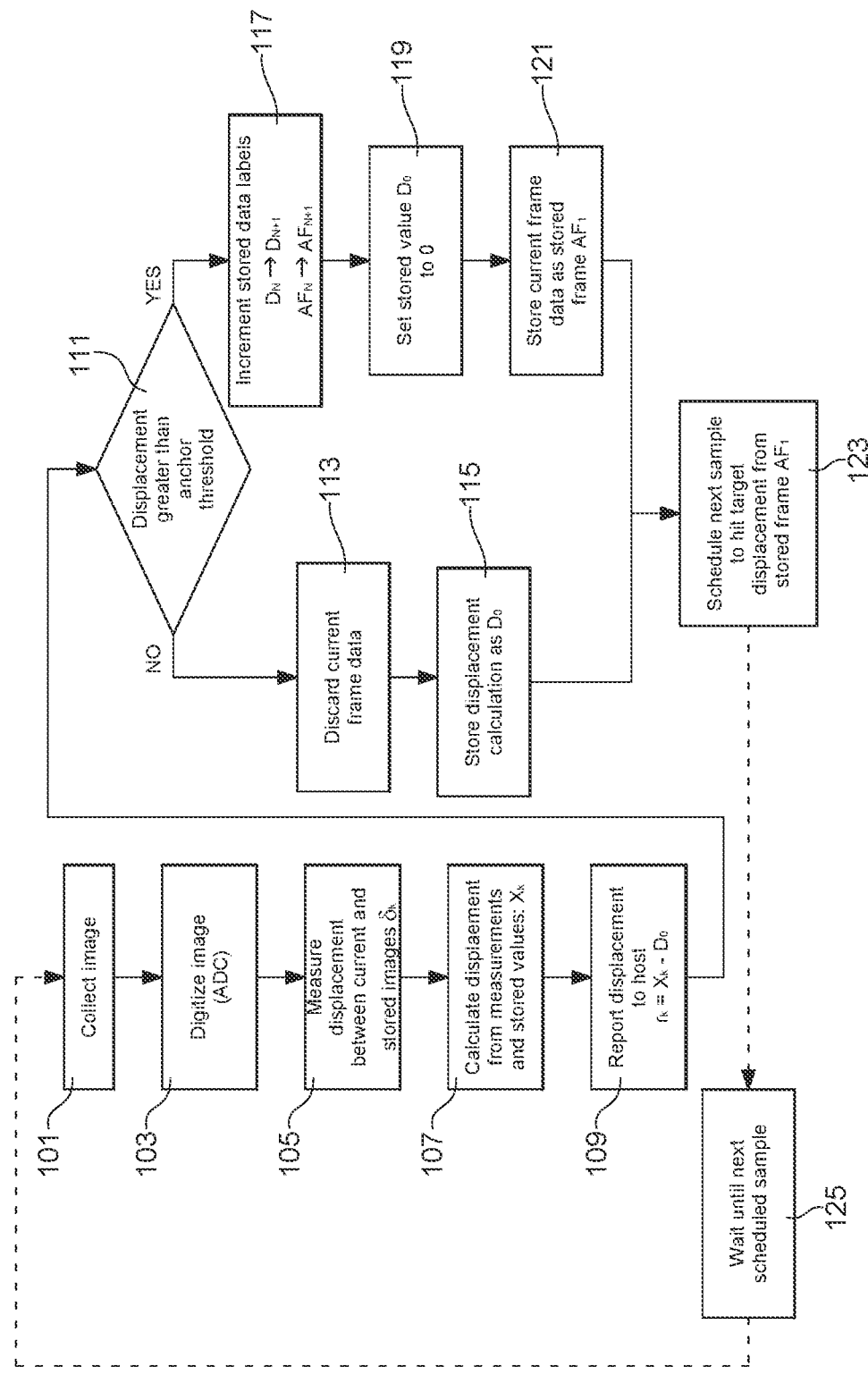
FIG. 5 is a flow chart summarizing the method steps of an example mouse tracking method according to the present invention.

The flow chart of FIG. 5 summarizes the frame anchoring method described above. In step 101, the image sensor of the mouse 3 collects an analog pixel image, which in step 103 is digitized, and the result (i.e. the current frame) is stored in a current frame buffer. In step 105, a comparison is performed between the current frame and one or more previously collected frames in memory to create displacement measurements. In step 107, these measurements are used to determine the current frame's displacement $x_k$ from the most recent anchor frame $AF_1$. In step 109, the current displacement value $r_k = x_k - D_0$ of the current image is calculated and reported to the host computer. If the previous report sent was generated from an anchor frame, then $r_k = x_k$ as $D_0$ would equal to 0. If the previous report sent was generated from an intermediate frame, then $D_0$ would take a non-zero value. In other words, in this scenario, the current displacement value of the current frame would be the displacement of the current frame (calculated with respect to the previous anchor frame) minus the displacement of the previous frame (also calculated with respect to the previous anchor frame). In step 111, it is determined whether or not the current frame is an anchor frame. This determination is done by comparing the spatial distance of the current frame to the immediately previous anchor frame (i.e., the displacement). If this distance is equal to or greater than an anchor displacement threshold, then the current frame is labelled as an anchor frame, otherwise it is labelled as an intermediate frame. In the present example, the displacement threshold is a pixel value selected from a range of 2 to 10 pixels, and in particular from a range of 4 to 6 pixels. If the current frame is an intermediate frame, then in step 113 the current frame data are discarded, and in step 115 the current displacement calculation $x_k$ is stored as $D_0$. If in step 111 it was determined that the current frame is an anchor frame, then in step 117 the stored data labels are incremented: $D_0 \rightarrow D_{N+1}$ and $AF_N \rightarrow AF_{N+1}$, in step 119, the value of $D_0$ is set to 0, and in step 121, the current frame data are stored as stored frame $AF_1$. Thus, if the current frame is an anchor frame, then the current frame is written from the current frame buffer to overwrite the oldest anchor frame in memory. In step 123, the mouse calculates its current speed based on the displacement report and the time between samples. This step also includes scheduling delay until next image collection according to the mouse speed to hit the target displacement from the most recent anchor frame $AF_1$. In step 125, the mouse waits until the scheduled time, and the process continues in step 101, where a new image is collected. It to be noted that the order of the steps shown in the flow chart may be interchanged. For example, step 111 may be carried out before the displacement is measured. The proposed method may be considered a computer-implemented method as all or at least some of the method steps are implemented by software.

At least some of the above-described method steps may be carried out by suitable circuits or circuitry. The terms "circuits" and "circuitry" refer to physical electronic components or modules (e.g. hardware), and any software and/or firmware ("code") that may configure the hardware, be executed by the hardware, and or otherwise be associated with the hardware. The circuits may thus be configured or operable to carry out or they comprise means for carrying out the required method as described above.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of tracking a position of an optical computer mouse based on determining a spatial displacement between image frames, wherein a respective image frame is considered as an anchor frame if the respective image frame comes first in a sequence of image frames or the distance of the respective image frame to its immediately previous anchor frame is equal to or greater than a displacement threshold, and the respective image is considered as an intermediate frame if its distance to its immediately previous anchor frame is below the anchor displacement threshold, the method comprising:
    obtaining a current image frame with a set of distinct features, the current image frame being obtained with an image sensor of the computer optical mouse comprising an array of pixels, the current image frame at least partially overlapping the immediately previous anchor frame of the current image frame such as at least some of the features of the current image frame are visible in the immediately previous anchor frame of the current image frame; and
    obtaining a current displacement value of the current image frame with respect to the immediately previous image frame of the current image frame, the current displacement value substantially equaling to, or being derived from a displacement of the current image frame with respect to the immediately previous anchor frame of the current image frame in the case where the immediately previous image frame of the current image frame is an anchor frame, and the current displacement value substantially equaling to, or being derived from the displacement of the current image frame with respect to the immediately previous anchor frame of the current image frame deducted by a displacement of the immediately previous image frame of the current image frame obtained with respect to the immediately previous anchor frame of the current image frame in the case where the immediately previous image frame of the current image frame is an intermediate frame.

2. The method according to claim 1, wherein the method further comprises the mouse generating a displacement report comprising the current displacement value, and the mouse sending the displacement report to a host computer.

3. The method according to claim 2, wherein the method further comprises the host computer updating the position of the mouse based on the displacement report.

4. The method according to claim 1, wherein the current displacement value and the displacements are measured in pixels or in another unit derived from pixels.

5. The method according to claim 1, wherein the obtaining the current image frame, and the obtaining the current displacement value are carried out by the mouse.

6. The method according to claim 1, wherein the displacement threshold is a pixel value selected from a range of 2 to 10 pixels, and in particular from a range of 4 to 6 pixels.

7. The method according to claim 1, wherein the method further comprises the mouse storing the current image frame in memory only if it is determined to be an anchor frame.

8. The method according to claim 1, wherein the method further comprises the mouse storing the current image frame in a memory if it is determined to be an anchor frame, updating labels of image frames in the memory, and the current image frame overwriting the oldest image frame in the memory while labeling the current image frame as the most recent anchor frame.

9. The method according to claim 1, wherein the displacement of the current image frame with respect to the immediately previous anchor frame involves calculating a displacement measurement of the current image frame with respect to at least a second immediately previous anchor frame of the current image frame.

10. The method according to claim 9, wherein a respective displacement measurement is allocated a respective weight, and wherein at least two displacement measurements are allocated different weights.

11. The method according to claim 9, wherein the displacement of the current image frame with respect to its immediately previous anchor frame is obtained as:

$$x_k = \sum_{i=1}^{n} \frac{a_i \left( \delta_i - \sum_{j=1}^{i-1} D_j \right)}{\sum_{i=1}^{n} a_i}$$

where $a_i$ denotes a weight, $D_j$ denotes a stored displacement value which records the distance calculated between stored anchor frames $AF_N$ and $AF_{N+1}$, and $\delta_i$ denotes a displacement measurement generated from comparing the current image frame $F_k$ and a stored anchor frame $AF_i$.

12. The method according to claim 10, wherein the value of the respective weight inversely correlates with a noise value of the displacement measurement it is assigned to.

13. The method according to claim 1, wherein the method further comprises refining one or more stored displacement values recording the distance calculated between stored anchor frames using one or more displacement measurements of the current image frame with respect to one or more previous anchor frames of the current image frame.

14. A non-transitory computer program product comprising instructions for implementing of the method according to claim 1, when loaded and run on computing means of a computing device.

15. An optical computer mouse (3) for tracking a position of the mouse (3) based on determining a spatial displacement between image frames, wherein a respective image frame is considered as an anchor frame if the respective image frame comes first in a sequence of image frames or the distance of the respective image frame to its immediately previous anchor frame is equal to or greater than a displacement threshold, and the respective image is considered as an intermediate frame if its distance to its immediately previous anchor frame is below the displacement threshold, the mouse (3) being configured to:

obtain a current image frame with a set of distinct features, the current image frame being obtained with an image sensor of the computer optical mouse (3) comprising an array (9) of pixels (11), the current image frame at least partially overlapping the immediately previous anchor frame of the current image frame such as at least some of the features of the current image frame are visible in the immediately previous anchor frame of the current image frame; and obtain a current displacement value of the current image frame with respect to the immediately previous image frame of the current image frame, the current displacement value substantially equaling to, or being derived from a displacement of the current image frame with respect to the immediately previous anchor frame of the current image frame in the case where the immediately previous image frame of the current image frame is an anchor frame, and the current displacement value substantially equaling to, or being derived from the displacement of the current image frame with respect to the immediately previous anchor frame of the current image frame deducted by a displacement of the immediately previous image frame of the current image frame obtained with respect to the immediately previous anchor frame of the current image frame in the case where the immediately previous image frame of the current image frame is an intermediate frame.

* * * * *